(12) United States Patent
Oyadomari et al.

(10) Patent No.: US 7,519,078 B2
(45) Date of Patent: Apr. 14, 2009

(54) AUTOMATED ETHERNET CONFIGURATION OF CATV NETWORK

(75) Inventors: Randy Ichiro Oyadomari, San Jose, CA (US); Arthur Michael Lawson, Morgan Hill, CA (US); Stephen Charles Gordy, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 915 days.

(21) Appl. No.: 10/845,202

(22) Filed: May 12, 2004

(65) Prior Publication Data

US 2005/0254523 A1 Nov. 17, 2005

(51) Int. Cl.
*H04J 3/16* (2006.01)
*H04J 1/00* (2006.01)

(52) U.S. Cl. ................................. 370/465; 370/487
(58) Field of Classification Search ................. 370/465, 370/487
See application file for complete search history.

(56) References Cited

U.S. PATENT DOCUMENTS

| | | | |
|---|---|---|---|
| 4,809,271 A * | 2/1989 | Kondo et al. ............... | 370/535 |
| 4,862,392 A | 8/1989 | Steiner | |
| 5,014,309 A | 5/1991 | West, Jr. | |
| 5,036,315 A | 7/1991 | Gurley | |
| 5,070,402 A | 12/1991 | Ishii et al. | |
| 5,142,690 A | 8/1992 | McMullan, Jr. et al. | |
| 5,155,590 A | 10/1992 | Beyers, II et al. | |
| 5,208,854 A | 5/1993 | West, Jr. | |
| 5,225,902 A | 7/1993 | McMullan, Jr. | |
| 5,235,619 A | 8/1993 | Beyers, II et al. | |
| 5,243,651 A | 9/1993 | Parikh et al. | |
| 5,245,420 A | 9/1993 | Harney et al. | |
| 5,247,364 A | 9/1993 | Banker et al. | |
| 5,251,324 A | 10/1993 | McMullan, Jr. | |
| 5,255,086 A | 10/1993 | McMullan, Jr. et al. | |
| 5,301,028 A | 4/1994 | Banker et al. | |
| 5,303,295 A | 4/1994 | West et al. | |

(Continued)

FOREIGN PATENT DOCUMENTS

WO WO 00/25459 5/2000

(Continued)

OTHER PUBLICATIONS

Office Action mailed Jun. 24, 2008, U.S. Appl. No. 10/845,006.

(Continued)

*Primary Examiner*—Andrew Lee
(74) *Attorney, Agent, or Firm*—Workman Nydegger

(57) ABSTRACT

A cable node and a cable hub that communicate on a CATV network are configured to switch compression modes without signal noise or degradation due to excessive delays in switching compression modes. In particular, a cable node sends one or more mute commands in an outgoing data stream to the cable hub, causing the cable hub to disable the RF outputs. Afterward, or along with the one or more mute commands, the cable node can send a switch mode command, thereby causing the cable hub to switch to the appropriate next communication mode, such as a communication mode using a new compression rate. When the cable node and the cable hub have switched to the appropriate next communication mode, the cable hub can then properly receive a corresponding data stream from the cable node using the next communication mode.

20 Claims, 5 Drawing Sheets

U.S. PATENT DOCUMENTS

| | | | |
|---|---|---|---|
| 5,313,467 A * | 5/1994 | Varghese et al. | 370/468 |
| 5,317,391 A | 5/1994 | Banker et al. | |
| 5,319,454 A | 6/1994 | Schutte | |
| 5,323,462 A | 6/1994 | Farmer | |
| 5,357,276 A | 10/1994 | Banker et al. | |
| 5,430,568 A | 7/1995 | Little et al. | |
| 5,442,472 A | 8/1995 | Skrobko | |
| 5,481,542 A | 1/1996 | Logston et al. | |
| 5,497,187 A | 3/1996 | Banker et al. | |
| 5,499,241 A | 3/1996 | Thompson et al. | |
| 5,505,901 A | 4/1996 | Harney et al. | |
| 5,539,822 A | 7/1996 | Lett | |
| 5,581,555 A | 12/1996 | Dubberly et al. | |
| 5,594,726 A | 1/1997 | Thompson et al. | |
| 5,684,799 A | 11/1997 | Bigham et al. | |
| 5,719,867 A | 2/1998 | Borazjani | |
| 5,719,872 A | 2/1998 | Dubberly et al. | |
| 5,794,117 A | 8/1998 | Benard | |
| 5,826,167 A | 10/1998 | Jelinek et al. | |
| 5,844,706 A | 12/1998 | Kohn et al. | |
| 5,854,703 A | 12/1998 | West, Jr. | |
| 5,854,830 A * | 12/1998 | Kenmochi | 379/100.15 |
| 5,864,560 A * | 1/1999 | Li et al. | 370/465 |
| 5,907,363 A | 5/1999 | Botsford et al. | |
| 5,926,478 A | 7/1999 | Ghaibeh et al. | |
| 5,930,231 A | 7/1999 | Miller et al. | |
| 5,963,352 A | 10/1999 | Atlas et al. | |
| 6,041,056 A | 3/2000 | Bigham et al. | |
| 6,161,011 A | 12/2000 | Loveless | |
| 6,175,861 B1 | 1/2001 | Williams, Jr. et al. | |
| 6,178,446 B1 | 1/2001 | Gerszberg et al. | |
| 6,272,150 B1 | 8/2001 | Hrastar et al. | |
| 6,356,369 B1 | 3/2002 | Farhan | |
| 6,356,374 B1 | 3/2002 | Farhan | |
| 6,373,611 B1 | 4/2002 | Farhan et al. | |
| 6,389,075 B2 | 5/2002 | Wang et al. | |
| 6,417,949 B1 | 7/2002 | Farhan et al. | |
| 6,433,906 B1 | 8/2002 | Farhan | |
| 6,437,895 B1 | 8/2002 | Farhan et al. | |
| 6,449,071 B1 | 9/2002 | Farhan et al. | |
| 6,457,178 B1 | 9/2002 | Slim | |
| 6,462,851 B1 | 10/2002 | West, Jr. | |
| 6,493,005 B1 | 12/2002 | Wu | |
| 6,505,271 B1 | 1/2003 | Lien et al. | |
| 6,519,067 B2 | 2/2003 | Farhan et al. | |
| 6,523,177 B1 | 2/2003 | Brown | |
| 6,535,715 B2 | 3/2003 | Dapper et al. | |
| 6,625,166 B2 * | 9/2003 | Tsukamoto et al. | 370/466 |
| 6,754,221 B1 * | 6/2004 | Whitcher et al. | 370/401 |
| 6,831,901 B2 | 12/2004 | Millar | |
| 7,000,018 B1 * | 2/2006 | Begis | 709/227 |
| 2002/0073434 A1 | 6/2002 | Pience | |
| 2002/0129379 A1 | 9/2002 | Levinson et al. | |
| 2002/0131426 A1 | 9/2002 | Amit et al. | |
| 2003/0035445 A1 | 2/2003 | Choi | |
| 2005/0039103 A1 * | 2/2005 | Azenko et al. | 714/776 |
| 2006/0013194 A1 * | 1/2006 | Baumann et al. | 370/352 |

FOREIGN PATENT DOCUMENTS

| | | |
|---|---|---|
| WO | WO 0143441 | 6/2001 |
| WO | WO 01/52455 | 7/2001 |

OTHER PUBLICATIONS

U.S. Appl. No. 09/735,710, filed Dec. 28, 2005, Non-Final Rejection.
U.S. Appl. No. 09/735,710, filed Jun. 02, 2006, Non-Final Rejection.
U.S. Appl. No. 09/735,710, filed Oct. 30, 2006, Final Rejection.
U.S. Appl. No. 09/735,710, filed Apr. 9, 2007, Notice of Allowance.
U.S. Appl. No. 10/285,205, filed Jan. 6, 2006, Non-Final Rejection.
U.S. Appl. No. 10/285,205, filed Jul. 25, 2006, Final Rejection.
U.S. Appl. No. 10/285,205, filed Jan. 22, 2007, Notice of Allowance.
U.S. Appl. No. 10/102,619, filed Apr. 29, 2008, Non-Final Rejection.
U.S. Appl. No. 10/102,625, filed Jun. 16, 2008, Non-Final Rejection.

* cited by examiner

AUTOMATED ETHERNET CONFIGURATION OF CATV NETWORK

BACKGROUND OF THE INVENTION

1. The Field of the Invention

The present invention relates generally to upstream data communications over networks primarily designed for downstream transmission of television and data signals, and particularly to a system and method for accurately changing the compression mode between two points without introducing errors in a signal.

2. Background and Relevant Art

Cable television systems (CATV) were initially deployed so that remotely located communities were allowed to place a receiver on a hilltop and then use coaxial cable and amplifiers to distribute received signals down to the town which otherwise had poor signal reception. These early systems brought the signal down from the antennas to a "head end" and then distributed the signals out from this point. Since the purpose was to distribute television channels throughout a community, the systems were designed to be one-way and did not have the capability to take information back from subscribers to the head end.

Over time, it was realized that the basic system infrastructure could be made to operate two-way with the addition of some new components. Two-way CATV was used for many years to carry back some locally generated video programming to the head end where it could be up-converted to a carrier frequency compatible with the normal television channels.

Definitions for CATV systems today call the normal broadcast direction from the head end to the subscribers the "forward path" and the direction from the subscribers back to the head end the "return path". A good review of much of today's existing return path technology is contained in the book entitled *Return Systems for Hybrid Fiber Coax Cable TV Networks,* by Donald Raskin and Dean Stoneback, hereby incorporated by reference as background information.

One additional innovation has become pervasive throughout the CATV industry over the past 10 years—the introduction of analog optical fiber transmitters and receivers operating over single mode optical fiber. These optical links have been used to break up the original tree and branch architecture of most CATV systems and to replace that with an architecture labeled Hybrid Fiber/Coax (HFC). In this approach, optical fibers connect the head end of the system to neighborhood nodes, and then coaxial cable is used to distribute signals from the neighborhood nodes to homes, businesses and the like in a small geographical area. Return path optical fibers are typically located in the same cable as the forward path optical fibers so that return signals can have the same advantages as the forward path.

FIG. 1 is a block diagram of a prior art cable television system 100 that uses conventional analog return path optical fiber links. Each subtree 102 on the system comprises a coaxial cable 106 that is coupled to a cable modem 108, each cable modem 108 being used by subscribers for Internet access. The coaxial cable 106 is also coupled to set top boxes (not shown) and other equipment (not shown), which are not relevant to the present discussion. The coaxial cable 106 of each subtree 102 is further coupled to at least one forward path optical fiber 110 and at least one return path optical fiber 112, typically through a cable node. An analog optoelectronic transceiver 114 (typically at the cable node) provides the data path coupling the coaxial cable 106 to the optical fibers 110, 112.

An RF input signal, having an associated signal level, is submitted to a transmitter portion of the optoelectronic transceiver 114, which in turn gains or attenuates the signal level, as appropriate. The RF input signal is then amplitude-modulated, and converted into a corresponding optical signal by a laser diode 122. Both Fabre-Perot (FP) and distributed feedback (DFB) lasers are typically used for this application. DFB lasers are used in conjunction with an optical isolator, and have improved signal to noise over FP lasers, but at a sacrifice of substantial cost. DFB lasers are preferred, as the improved SNR allows for better system performance when aggregating multiple returns.

The optical signal from the laser diode 122 is coupled to a single mode optical fiber (i.e., the return path optical fiber 112) that carries the signal to an optical receiver 130 typically located at a cable hub, such as a cable hub at the head end system 132. The optical receiver 130 converts the amplitude-modulated light signal back to an RF signal. Sometimes a manual output amplitude adjustment mechanism is provided to adjust the signal level of the output produced by the optical receiver. A cable modem termination system (CMTS) 134 at the head end 132 receives and demodulates the recovered RF signals so as to recover the return path data signals sent by the subscribers.

FIGS. 2 and 3 depict the transmitter 150 and receiver 170 of a prior art return path link. The transmitter 150 (e.g., a cable node) digitizes the RF signal received from the coaxial cable 106, using an analog to digital converter (ADC) 152. The ADC 152 generates a ten-bit sample value for each cycle of the receiver's sample clock 153A, which is generated by a local, low noise clock generator 156. The output from the ADC 152 is converted by a serializer 154 into a serial data stream. The serializer 154 encodes the data usin a standard 8B/10B mapping (i.e., a bit-value-balancing mapping), which increases the amount of data to be transmitted by twenty-five percent. This encoding is not tied to the 10-bit boundaries of the sample values, but rather is tied to the boundary of each set of eight samples (80 bits), which are encoded using 100 bits.

When the sample clock operates at a rate of 100 MHz, the output section of the serializer 154 is driven by a 125 MHz clock 157A, and outputs data bits to a fiber optic transmitter 158, 159 at a rate of 1.25 Gb/s. The fiber optic transmitter 158, 159 converts electrical 1 and 0 bits into optical 1 and 0 bits, which are then transmitted over an optical fiber 112. The fiber optic transmitter includes a laser diode driver 158 and a laser diode 159.

The receiver 170 at the receive end (e.g., a cable hub) of the optical fiber 112 includes a fiber receiver 172, 174 that receives the optical 1 and 0 bits transmitted over the optical fiber 112, and converts them into corresponding electrical 1 and 0 bits. This serial bit stream is conveyed to a deserializer circuit 178. A clock recovery circuit 176 recovers a 1.25 GHz bit clock from the incoming data and also generates a 100 MHz clock that is synchronized with the recovered 1.25 GHz bit clock.

The recovered 1.25 GHz bit clock is used by the deserializer 178 to clock in the received data, and the 100 MHz clock is used to drive a digital to analog converter 180, which converts ten-bit data values into analog voltage signals at the head end system. As a result, the RF signal from the coaxial cable 106 is regenerated at point 182 of the head end system.

Prior art return path link systems, such as the one shown in FIGS. 2 and 3, have used a low noise oscillator at the transmitter for the A/D sample clock 152. The same oscillator is also used as a reference for a synthesizer that generates a coherent symbol clock 157A for the communications link.

The receiver 170 recovers the symbol clock 157B (e.g., via clock recovery circuit 176). Unfortunately, time jitter may be introduced in some cases in the receiver sample clock (e.g., via circuit 176) by the described communications path. As such, the receiver's clock recovery circuit must react quickly to maintain lock on the received data.

In addition to the foregoing, there is a need to include other types of data, such as non-RF data, in present CATV network communications. In particular, there is a growing need to allow Ethernet data to be transmitted on the CATV pathway. However, in order for bandwidth to be available in the return path for including Ethernet data, the RF data must be compressed.

Conventional CATV network communications may be essentially divided into two classes. In one class, the cable node transmits the RF data as sampled, without any compression. In such systems, bandwidth for Ethernet data is limited. This communication will be referred to herein as "RF data" communication mode. In another class, the cable node compresses the RF data, and then combines the compressed RF data with the Ethernet data. The cable node then transmits the combined data to the cable hub. This communication will be referred to herein as "RF and Ethernet" communication mode. While effective in communicating using their corresponding communication modes, the conventional CATV network communication systems do not easily switch between RF data communication mode, and RF and Ethernet data communication mode.

Accordingly, what would be advantageous are mechanism for more seamlessly changing between RF data communication mode, and RF and Ethernet data communication mode.

BRIEF SUMMARY OF THE INVENTION

The present invention solves one or more of the foregoing problems in the prior art with systems, methods, and apparatus configured to make bandwidth available for non-RF data when directed to do so. In particular, the present invention enables CATV systems to easily switch between RF data communication mode in the return path, and RF and Ethernet data communication mode. In the RF and Ethernet data communication mode, a special compression algorithm is used to make space in the data stream for the Ethernet data.

The cable node transmits mode information without using the compression algorithm to the cable hub over the return path. The mode information signals that the cable node will be transmitting Ethernet data to the cable hub over the return path. Subsequently, the cable node compresses received RF data using the compression algorithm, and transmits the compressed RF data with Ethernet data to the cable hub. The mode information may initially include a mute command that causes the cable hub to temporarily mute the RF outputs. Accordingly, the CATV system may be easily configured to switch between RF data communication mode and RF and Ethernet data communication mode.

Additional features and advantages of examples of the invention will be set forth in the description which follows, and in part will be obvious from the description, or may be learned by the practice of such examples. The features and advantages of such implementations may be realized and obtained by means of the instruments and combinations particularly pointed out in the appended claims. These and other features will become more fully apparent from the following description and appended claims, or may be learned by the practice of such examples as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention solves one or more of the foregoing problems in the prior art with systems, methods, and apparatus configured to make bandwidth available for non-RF data when directed to do so. In particular, the present invention enables CATV systems to easily switch between RF data communication mode in the return path, and RF and Ethernet data communication mode.

Figure 1:
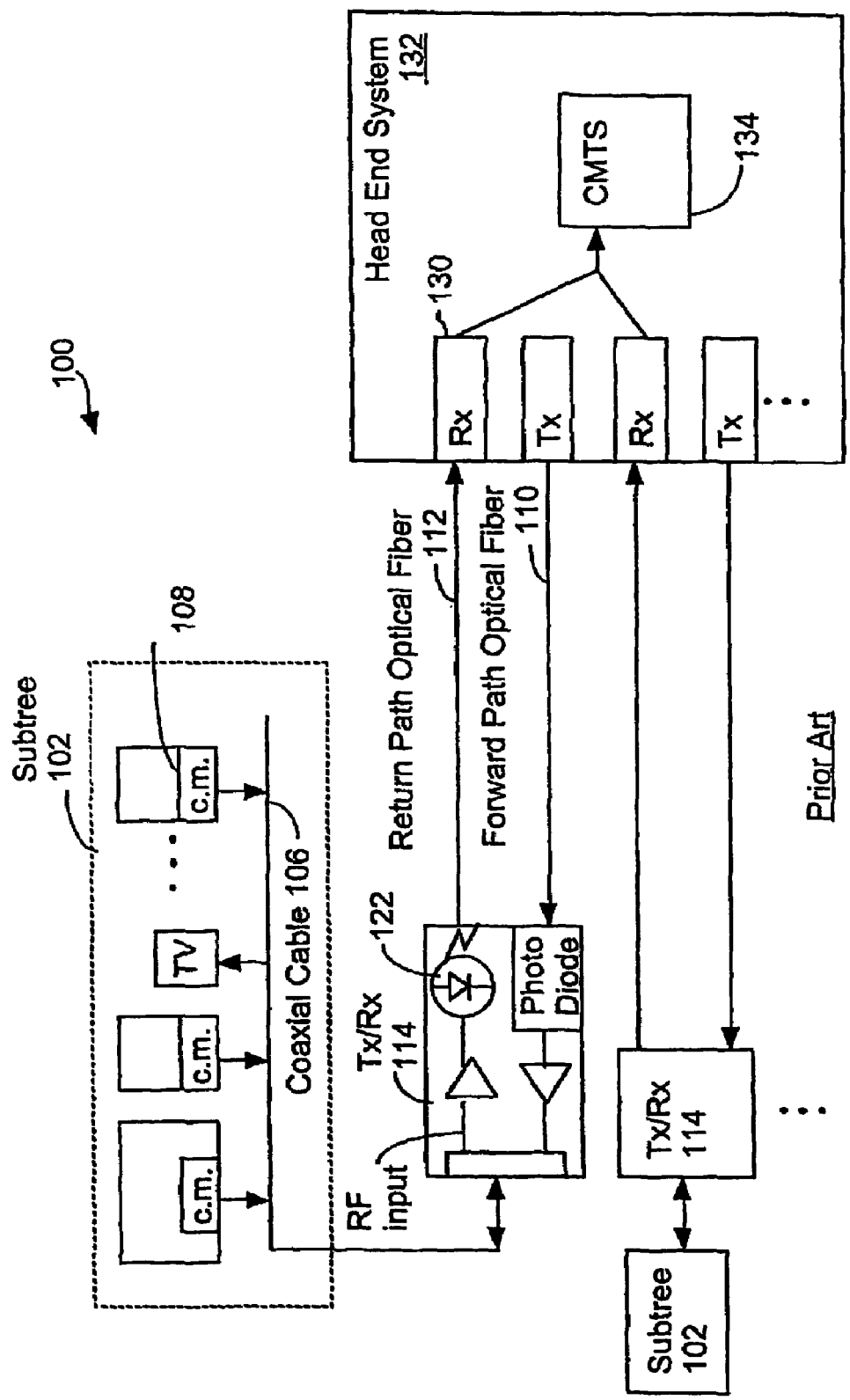
FIG. 1 is a block diagram of a prior art analog return path link system.
Figure 2:
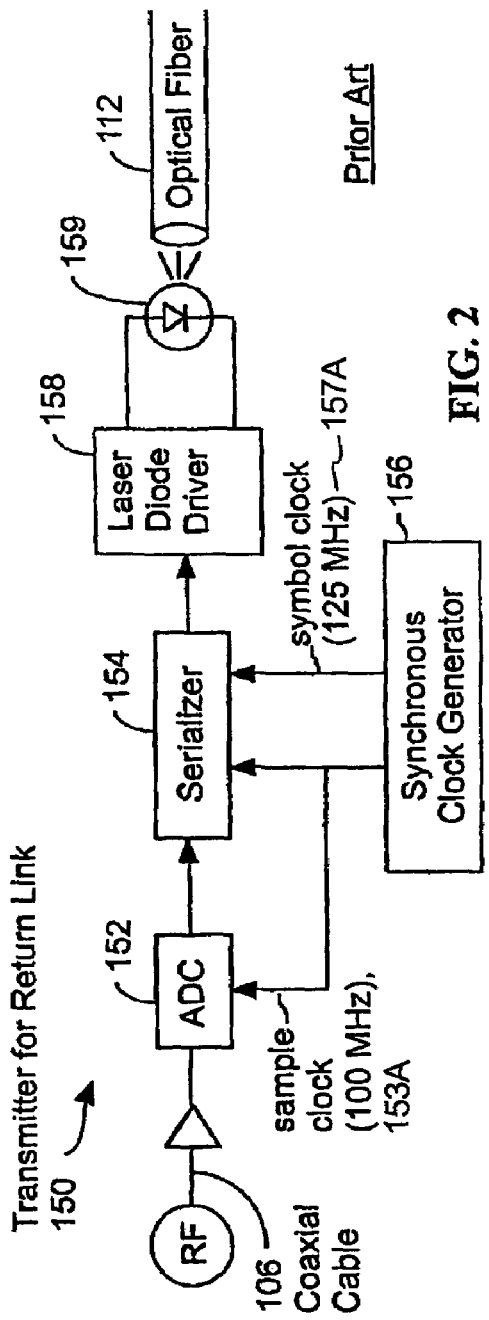
FIGS. 2 and 3 are block diagrams of the transmitter and receiver, respectively, of a prior art digital return path link system.
Figure 3:
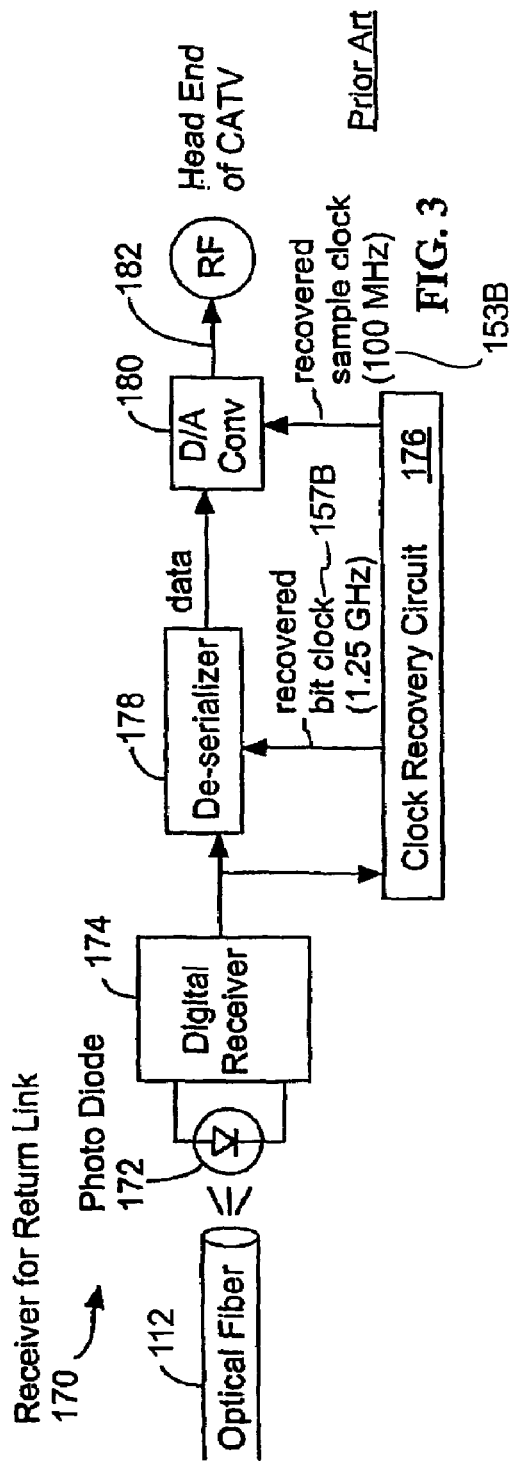
Figure 4:
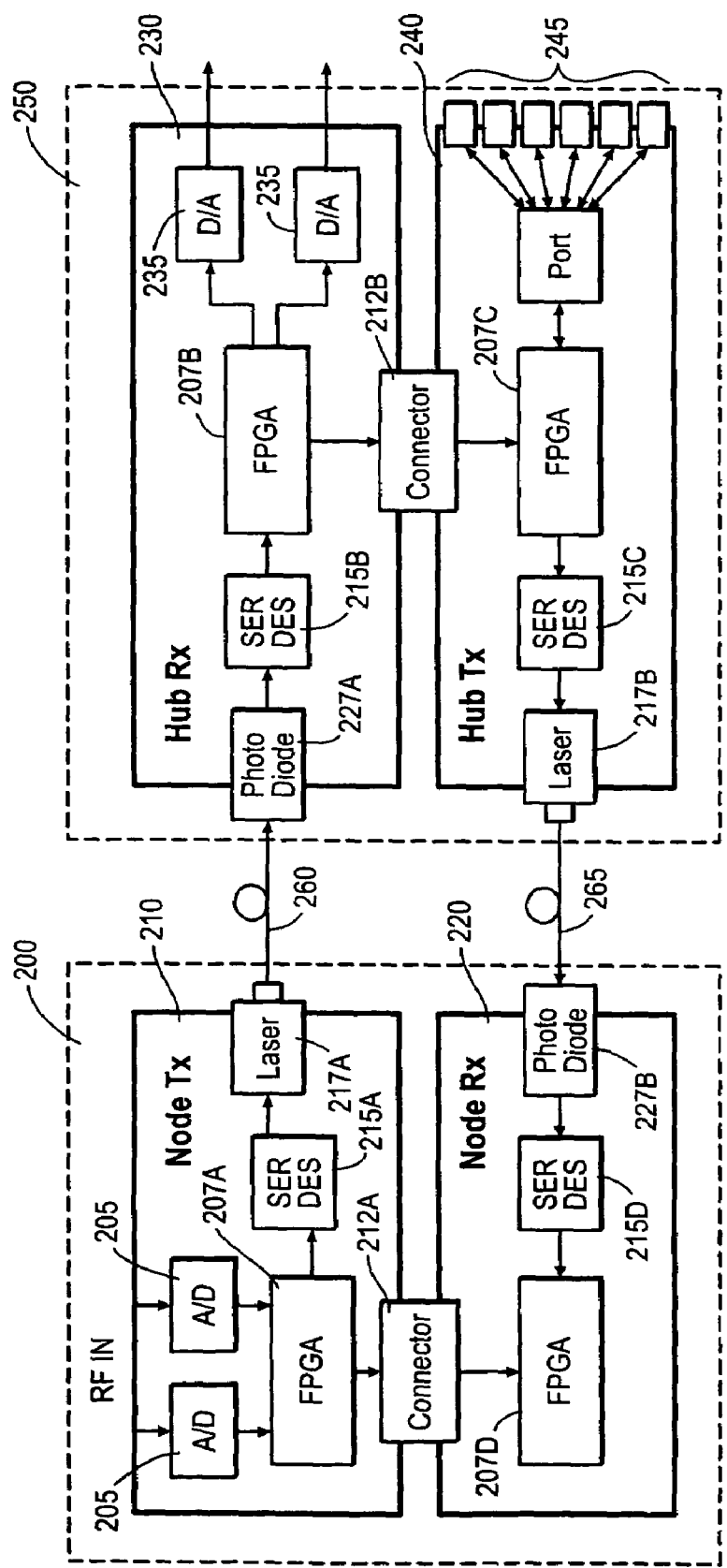
FIG. 4 provides an overview block diagram of a cable node and a cable hub on an example CATV network in accordance with an implementation of the present invention.

In particular, FIG. 4 provides a generalized overview of an example of a CATV communication system, wherein Ethernet-ready components (e.g., 210, 220) of an Ethernet-ready cable node 200 communicate with Ethernet-ready components (e.g., 230, 240) of a cable hub 250 over coaxial and optical cable. By way of explanation, the term "Ethernet-ready" will be understood to mean CATV components that are capable of communicating using one of at least two communication modes. One of these communication modes is the RF data communication mode in which RF data is transmitted without Ethernet data over the return path. The other communication mode permits Ethernet data to accompany the RF data by compressing the RF data to make bandwidth available for the Ethernet data. This latter communication mode is referred to herein as the RF and Ethernet data communication mode. In the RF and Ethernet data communication mode, the cable hub is able to communicate Ethernet data in the forward direction to the cable node.

In particular, FIG. 4 provides a generalized overview of an example of a CATV communication system, wherein components (e.g., 210, 220) of a cable node 200 communicate with components (e.g., 230, 240) of a cable hub 250 over coaxial and/or optical cable. With reference to a cable node 200, for example, the cable node 200 can comprise a node transmission component (hereinafter "Node Tx") 210, having one or more analog-to-digital converters 205. Typically, a cable node 200 receives one or more analog RF signals at the Node Tx 210 via coaxial cables (not shown) connected to one or more corresponding subtrees. The Node Tx 200 then samples the one or more analog RF signals at analog-to-digital converters 205, such that the analog RF signals become digitized.

FIG. 4 also shows that an exemplary cable node 200 can comprise a node receiving component (hereinafter "Node Rx") 220. Typically, the Node Rx 220 component receives, generates, and/or otherwise transfers digital data signals, such as digital Ethernet data signals, to another component, such as to Node Tx 210 via connector 212A. A signal processing logic component 207D. (hereinafter "signal logic") at the Node Rx 220 comprises one or more sets of computer-executable instructions stored within the logic circuitry, which, when executed, direct the generation, formatting, and transfer, etc. of the digital Ethernet data signals. In at least one implementation, the signal processing logic component 207D, as well as any similar such component as described herein, is a field programmable gate array (FPGA). By way of explanation, although frequent reference is made herein to Ethernet protocol digital data, one will appreciate that implementations of the present invention are also configurable for other types of data transmission protocols and configurations, such as Token ring, and the like.

Similarly, the Node Tx 210 also comprises a signal processing logic component 207A. Similar with signal logic 207D, signal logic 207A also includes one or more sets of computer-executable instructions stored within the relevant logic circuitry, which, when executed, also direct relevant operations at Node Tx 210 for one or more of the data signals and/or component functions. Thus, for example, in one implementation, signal logic 207A can direct the sampling rate of the A/D converters, and can combine the digitized RF data with one or more Ethernet data signals received from the Node Rx 220.

In one embodiment, the cable node 200 is capable of operating in two different communication modes, depending on whether or not there is a Node Rx 220 available. If there is not a Node Rx 220 available, then the signal logic 207A does not combine RF data with Ethernet data. Instead, the RF data is sent (with potentially some other non-Ethernet supplemental data) over the return path 260 to a hub receiving component (hereinafter "Hub Rx") 230 of the cable hub 250. This communication mode will also be referred to herein as the "RF data" communication mode. If there is a Node Rx 220 available, then the cable node 200 is capable of processing Ethernet data as well. In this case, the signal logic 207A would compress the RF data to make room from the Ethernet data to be transmitted, and then combine the compressed RF data with the Ethernet data. This communication mode will also be referred to herein as the "RF and Ethernet data" communication mode.

In one embodiment, when operating in RF and Ethernet data communication mode, the signal logic 207A compresses the RF data using 10 bit fixed length to 9 bit fixed length compression algorithms. For this reason, this embodiment of the RF and Ethernet data communication mode may also be referred to as the 9-bit communication mode. Also in one embodiment, when operating in RF data mode, the RF data may not be compressed. In other words, the same 10 bits of RF data remains as 10 bits without modification. For this reason, this embodiment of the RF data communication mode may also be referred to as the 10-bit communication mode.

A more particular description of an example for combining digitized RF signals with digital non-RF signals is described in greater detail in commonly-assigned, U.S. patent application Ser. No. 09/735,710, filed Dec. 12, 2000, entitled "SYSTEM AND METHOD FOR TRANSMITTING DATA ON RETURN PATH OF CABLE TELEVISION SYSTEM", hereinafter referred to as REFERENCE 1.

A more particular description of an example for combining digitized RF signals with digital non-RF signals using a single master clock rate is described in greater detail in commonly-assigned, U.S. Patent Application No. 60/570,892, filed on the same day as the instant application, entitled "SINGLE MASTER CLOCK CONTROL OF ETHERNET DATA TRANSFER OVER BOTH A CABLE TV RETURN PATH AND AN ETHERNET FORWARD PATH", hereinafter referred to as REFERENCE 2.

A more particular description of an example for synchronizing the communication modes between corresponding CATV components is described in greater detail in commonly-assigned, U.S. patent application Ser. No. 10/845,006, filed on the same day as the instant application, entitled "CHANGING COMMUNICATION MODE IN A CATV PATHWAY USING MUTE COMMANDS", hereinafter referred to as REFERENCE 3. The entire contents of the foregoing REFERENCE 1, REFERENCE 2, and REFERENCE 3 are incorporated herein by reference.

By way of explanation, an RF data channel received through the Node Tx 210 is typically sampled at 10 bits per cycle, using a clock rate of 100 MHz. Based on an example component circuitry used in one or more present implementations of a CATV component, 100 MHz can translate roughly into 100 Mb/s that can be transferred over an optical cable. Since the RF data are sampled at 10 bits per cycles, two RF channels equate to roughly 2×10 bits×100 MHz, or roughly 2 Gb/s. In addition, the SERDES 215A can encode the data stream using an 8B/10B scheme before sending it to the laser 217A. The 8B/10B encoding increases the required bandwidth from 2.0 Gb/s to 2.5 Gb/s. This is now close to the maximum bandwidth available (roughly 2.5 Gb/s) on an optical fiber using standard optical protocols, particularly given that some of the bandwidth will be taken up by some processing overhead.

Compressing the RF data to 9 bits after sampling to 10 bits per stream frees 2×1 bit×100 MHz, or roughly 200 Mb/s of bandwidth. This 200 Mb/s of bandwidth can be used at any given Ethernet-ready cable node for transmitting Ethernet data. Of course, one will appreciate that other variables can affect the amount of Ethernet bandwidth. For example, a fiber channel may be configured for 10 Gb/s communications, or the RF data may be compressed to a greater or lesser degree than described herein.

Some descriptions of compression techniques for RF signals in CATV networks can be found in commonly-assigned, U.S. patent application Ser. No. 10/102,625, filed on Mar. 19, 2002, entitled "EFFICIENT TRANSMISSION OF DIGITAL RETURN PATH DATA IN CABLE TELEVISION RETURN PATH"; and in U.S. patent application Ser. No. 10/102,619, filed on Mar. 19, 2002, entitled "DATA RATE COMPRESSION FOR CABLE TELEVISION RETURN PATH USING BANDPASS PUNCTURING", hereinafter referred to respectively as REFERENCES 4 and 5.

Some descriptions of combining Ethernet data with compressed RF data on a cable return pathway can be found in U.S. patent application Ser. No. 10/285,205, filed on Oct. 30, 2002, entitled CABLE TELEVISION RETURN LINK SYSTEM WITH HIGH DATA-RATE SIDE-BAND COMMUNICATION CHANNELS, hereinafter referred to as REFER- ENCE 6. The entire contents of the foregoing REFERENCE 4, REFERENCE 5, and REFERENCE 6 are also incorporated herein by reference.

Continuing with FIG. 4, after the cable node 200 has combined the digitized RF and digital Ethernet data when transmitting in RF and Ethernet data communication mode, the cable mode transmits the data stream onto a "return" optical fiber 260 via optical laser 217A. Alternatively, the cable node transmits the RF data onto the optical fiber 260 without combining any Ethernet data when operating in RF communication mode.

In at least one implementation, transmitting the data (whether in RF communication mode or RF and data communication mode) comprises serializing the data stream at a SERDES component 215A. In any case, the serialized data (or non-serialized data) are then generally passed through a laser driver (not shown) and a laser diode 217A, which turns the electronic data stream into corresponding optical signals.

In any event, the cable hub 250 then receives the data stream at a Hub Rx 230, which comprises a photodiode 227A. The photodiode 227A converts the optical signals into corresponding electrical current signals, which are then processed by other components (e.g., transimpedance amplifier, post-amp, etc.—not shown) so that the data stream can be used by other components at the cable hub 250. If the data streams have been serialized before being transmitted by laser 217A, the data streams must first be deserialized at a corresponding SERDES 215B component at the cable hub.

However the data is transmitted and received, the data streams are then read and processed at the signal logic 207B. The signal logic 207B comprise computer-executable instructions stored within, which, when executed, performs appropriate processing on the data streams, assuming that the signal logic 207B knows which communication mode is being used. For example, if the data are sent in one communication mode by the Node Tx 210 (e.g., using the RF and data communication mode such as the 9-bit communication mode), the signal logic 207A at the Node Tx 210 will have ensured that the signal logic 207B at the Hub Rx 230 is set to that communication mode, thereby causing the signal logic 207B to separate out the compressed RF data and Ethernet data, and then decompress the RF data. If the data are sent in a another communication mode by the Node Tx 210 (e.g., using the RF communication mode such as the 10-bit communication mode), the signal logic 207A at the Node Tx 210 will have ensured that the signal logic 207B at the Hub Rx 230 is set to that other communication mode, thereby extracting the RF data without expecting Ethernet data and without decompressing the RF data.

Switching communication modes can be done by sending a "mute command", and, in some cases, then sending a "switch mode" command that instructs the signal logic 207B to switch to the second communication mode, or, for example, to the 9-bit compression mode. The "switch mode" command may be as passive as computer-readable instructions that simply imply that a future incoming data stream will be sent using a next communication mode.

When the relevant signal logic at the Node Tx 210 and the Hub Rx 230 are set in the same communication mode, the Hub Rx 230 can read the data sent by the Node Tx 210. As used herein, the terms "communication mode", and "first" or "second" "communication mode" refer to an arbitrary designation of compression algorithms (or lack of compression), such that the Node Tx 210 is sending a data stream using one or another communication/compression modes. Thus, for example, if the Node Tx 210 is sending a data stream using a first compression mode, the Node Tx 210 may be sending the data stream in 10-bit communication mode. Alternatively, if the Node Tx 210 is sending a data stream at a second communication mode, the Node Tx 210 may be sending a data stream using, for example, a 9-bit communication mode. Accordingly, one will appreciate after reading this specification and claims that first or second communication modes are arbitrary designations referencing an instant point in time and a next point in time for a given communication mode.

In one implementation, therefore, the cable node 200 configures the cable hub 250 to read data in a certain communication mode by sending a sequence of command instructions in the outgoing data stream. In particular, the Ethernet-ready cable node 200 can include a mode identification signal such as a "switch mode command", or a signal simply identifying an upcoming communication mode. When the Ethernet-ready cable hub 250 receives the identification signal, or the switch mode command, signal logic 207B at the Ethernet-ready cable hub 250 switches to using the appropriate communication mode. If the Ethernet-ready cable hub 250 is initially communicating using the RF data communication mode, the cable hub 250 can switch to communicating using the appropriate next communication mode such as the RF and Ethernet data communication mode. In any case, the cable hub is then configured to use the appropriate communication mode to interpret the received data signals.

In one implementation, therefore, the cable node 200 configures the cable hub 250 to read data in a certain communication mode by sending a sequence of command instructions in the outgoing data stream. In particular, and as will be understood more fully after reading this specification and claims, the cable node 200 can include a predetermined number of "mute commands" in the transmitted data stream. After the cable hub 250 receives a required number of "mute commands", the cable hub 250 mutes one or more of the channels as instructed, such as one or more of the RF channels. The cable node 200 then sends the relevant switch command (also referred to as a "subsequent communication") to the cable hub 250 that causes the relevant component of the cable hub 250 to switch to the appropriate compression algorithm. Afterward, the cable hub 250 can receive data that has been compressed at the appropriate bit rate, that is, data streams sent using the appropriate communication mode.

After the signal logic 207B has read and/or decompressed the received data stream as appropriate, the signal logic 207B can separate the RF data from the non-RF data (e.g., Ethernet data), and transfer the relevant data along the appropriate path. For example, the digitized RF data can be sent to digital-to-analog (D/A) converters 235, where the digitized RF data can be converted back to analog, and sent to the head end system. Similarly, the signal logic 207B can send the Ethernet data (if any) to a hub transmission sub-component (hereinafter "Hub Tx") 240 via connector 212B.

Ethernet data that is transferred to the Hub Tx 240 can then be sent to users or devices through ports 245, though it is also possible that at least some of the Ethernet data can be processed and/or relayed to the Node Rx 220 via the forward optical cable 265. In particular, signal logic 207C comprises one or more sets of computer-executable instructions stored within that, when executed, interpret and/or direct the Ethernet data traffic, process the Ethernet data, format the Ethernet data, direct the operation of components at the Hub Tx 240, and so forth as required. For example, the signal logic 207C can direct Ethernet data that arrives through ports 245 to be sent to the cable node 200 via the optical cable 265. In some cases, the signal logic 207C will direct the relevant Ethernet data to be first serialized at the SERDES component 215C.

When the Ethernet data is ready to be sent back to the node, an optical laser 217B converts the data stream into a corresponding optical signal, and transmits the corresponding optical signal on the forward optical cable 265 to Node Rx 220 of the cable node 200. The Node Rx 220 receives the optical version of the Ethernet data stream at the photodiode 227B, and converts the Ethernet data stream to a corresponding electrical signal, which can be processed by other components at Node Rx 220. For example, if the Ethernet data stream has been serialized prior to transmission at the cable hub 250, the Ethernet data stream will be deserialized by the SERDES component 215D. Thereafter, signal processing logic 207D can identify to where and how the Ethernet data will be directed. A more particular description of the transmission/reception, serialization/deserialization, and sampling/desampling of the relevant data signals is found in the incorporated REFERENCE 2.

Figure 5:
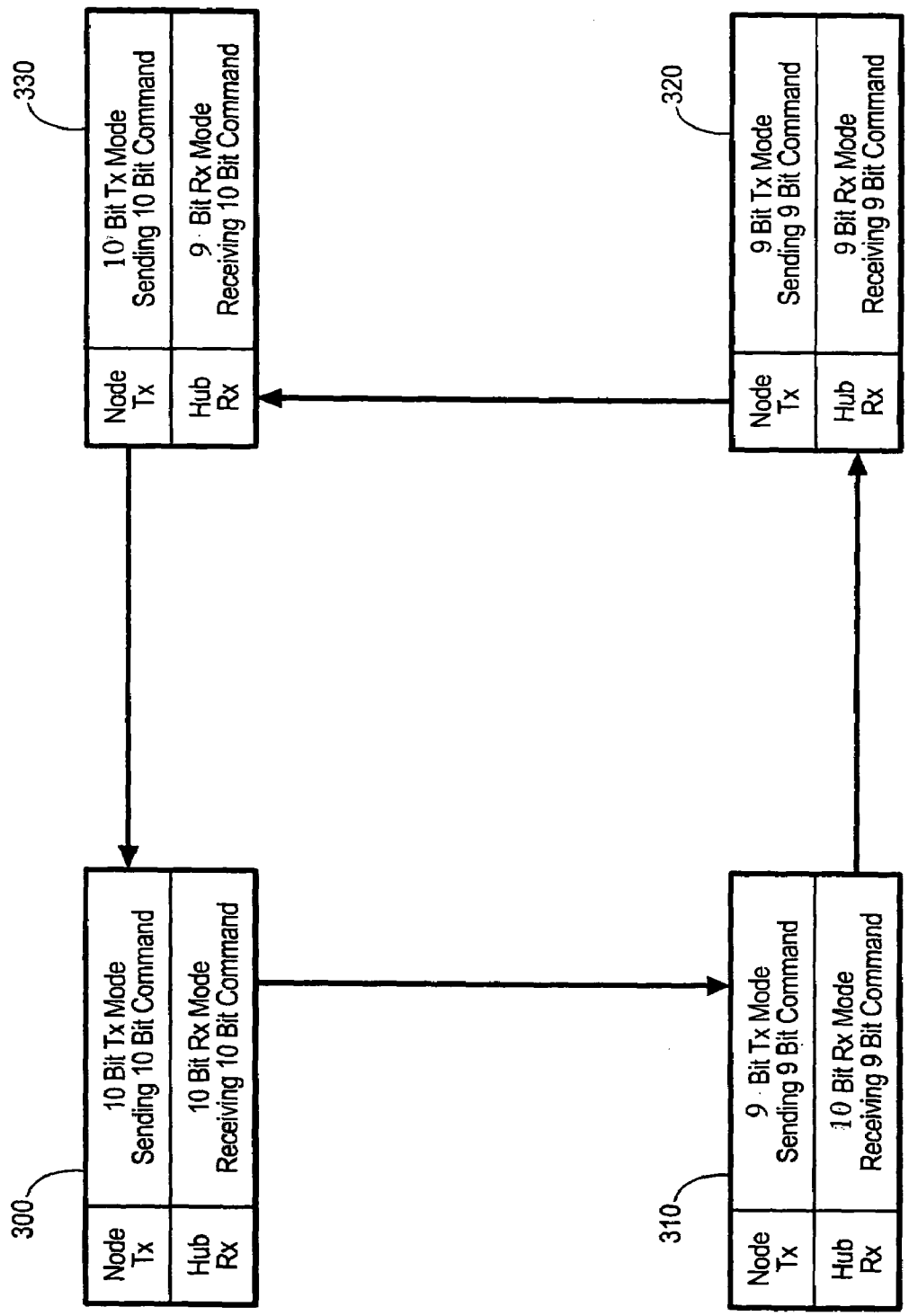
FIG. 5 provides a sequential overview block diagram for changing compression modes between the cable node and cable hub using mode information in accordance with an embodiment of the present invention.
Figure 6:
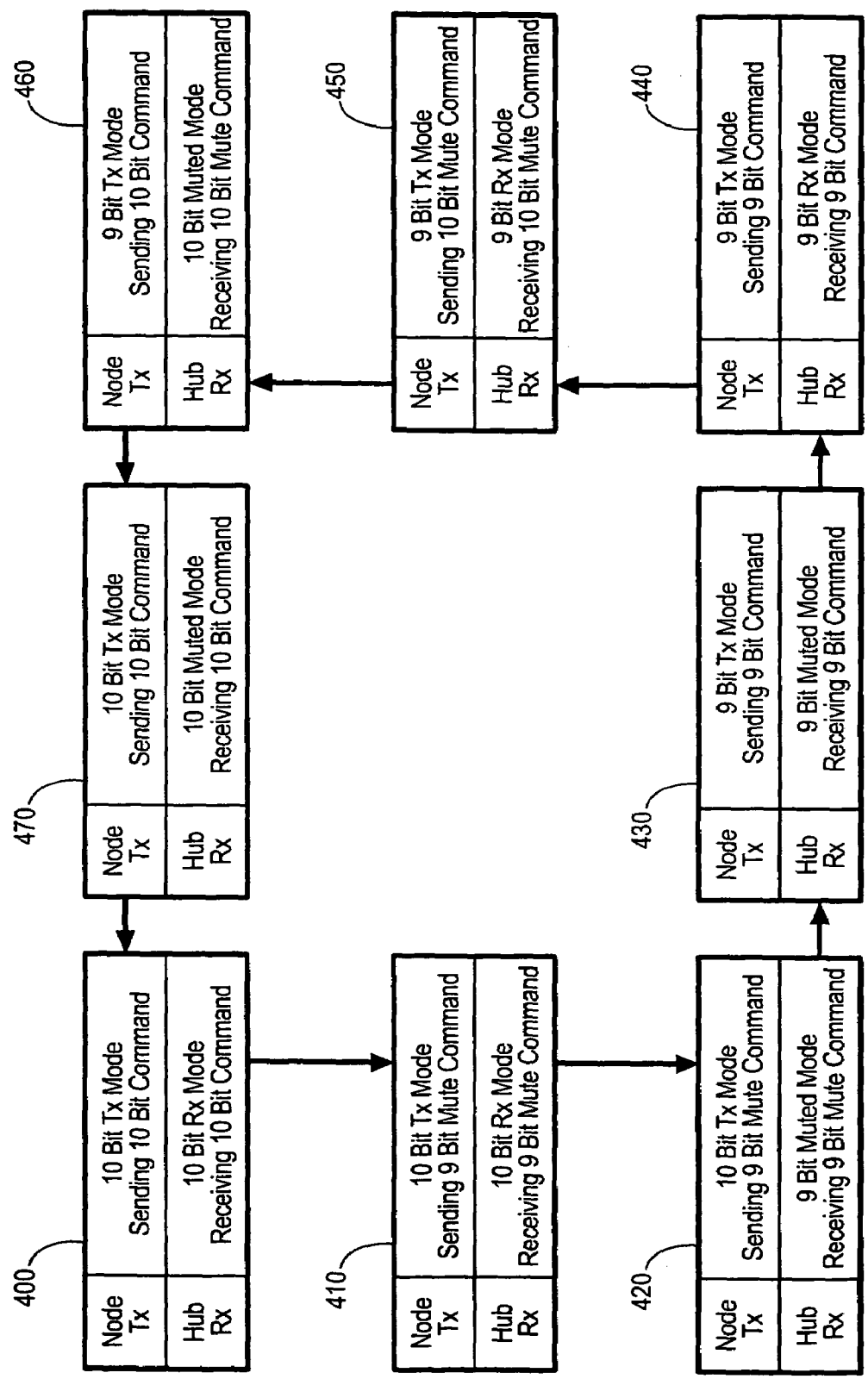
FIG. 6 provides a sequential overview block diagram for seamlessly changing compression modes between the cable node and cable hub using a mute command in accordance with an embodiment of the present invention.

FIG. 6 illustrates an example state diagram transition for changing states of an exemplary Ethernet-ready cable node 200 and Ethernet-ready cable hub 250, in accordance with one aspect of the present invention. The implementation of FIG. 6 is, in fact, a specific embodiment of the method described with respect to FIG. 5. By way of explanation, a change in "state" refers to any instance in time defined by communicating in a given communication mode, or by an instance of transition between given communicating modes (e.g., existing in a muted mode). For example, since the Hub Rx 230 has a muted state (e.g., disabling the RF outputs), the Hub Rx 230 can be thought to have four states, such as communicating in 9-bit mode, existing in a 9-bit muted state, communicating in a 10-bit mode, and existing in a 10-bit muted state. Whereas, since the Node Tx 210 simply transmits communication in one form or another, the Node Tx 210 can be thought to have two states, such as communicating in 9-bit mode, or communicating in 10-bit mode.

FIG. 6 further illustrates a state diagram transition with respect to switching from a default 10-bit communication mode to 9-bit communication mode (see states 400, 410, 420, 430 and 440 explained more fully below) and back again to 10-bit communication mode (see states 440, 450, 460, 470 and 400 explained more fully below). Of course, the concepts described herein will equally apply to the case where 9-bit compression is the default. Generally speaking, 9-bit/10-bit mode refers herein to a situation in which data described by 10 consecutive binary characters is at least temporarily represented (e.g., during transmission) by 9 consecutive binary characters. In particular, 9-bit compression of 10-bit data has been found useful for some implementations since some common types of RF signals can be safely compressed from 10-bit data to 9-bit data without meaningful data loss.

Reasons for compressing RF data signals in this manner include at least one benefit of providing as much as 200 Mb/s more bandwidth than under 10-bit mode. Specific types and advantage of certain compression algorithms, however, are not critical to the present disclosure. For example, a manufacturer may find that compressing a certain type of data stream to 3-bits, rather than to 9-bits, produces a desired effect within acceptable data loss parameters. All that is required in some implementations, therefore, is that a given Ethernet-ready cable node 200 or Ethernet-ready cable hub 250 be able to read a data stream based on a specific compression algorithm prior to receiving the data stream that has been compressed using that algorithm. Accordingly, upon reading the present specification and claims, one will appreciate that any number of compression algorithms can be employed equally consistent within the context of the present inventive concepts.

In any case, FIG. 6 further shows that, by default (state 400), the Ethernet-ready cable node 200 is configured to send data in 10-bit mode, and the Ethernet-ready cable hub 250 is configured to read the data in 10-bit mode. (This also happens to be the default state depicted in FIGS. 4 and 5) As previously described, the default communication mode may be used because, in one implementation, it is specifically selected or required. For example, the default communication mode may be used in one implementation due to a failure to detect a specific, required component, or due to a failure to detect a certain communication from another component. As well, default communication can apply in at least one implementation if there is a failure of the Node Tx 210 to detect the Node Rx 220. Alternatively, the default communication can apply if there is a failure to detect a specified signal from the Hub Tx 240 to the Node Rx 220. For purposes of description, the present example implementation shown in FIG. 6 requires ensuring a connection between Node Rx 220 and Hub Tx 240 prior to switching to a next communication mode.

In general, 10-bit communication mode involves communication of data (e.g., RF data) in the return path 260 only from the Node Tx 210 to the Hub Rx 230. Specifically, the Node Tx 210 sends 10-bit switch mode commands (i.e., commands that specify in which mode the Hub Rx 230 should operate), and the Hub Rx 230 receives 10-bit switch mode commands. However, if a Node Rx 220 is also present in the Ethernet-ready cable node 200, then forward path 265 communication from the Hub Tx 240 to the Node Rx 220 may also be desired. For example, perhaps a Node Rx 220 component was just added to the Ethernet-ready cable node 200. In that case, it may be desirable to transition to 9-bit communication mode so that Ethernet data may be transmitted bi-directionally. Specifically, RF data and Ethernet data may be transmitted in the return path with the extra bandwidth required for the Ethernet data being provided by performing 10-bit to 9-bit compression on the RF data. The forward path may be a dedicated optical link reserved for forward-path Ethernet data.

Continuing with FIG. 6, there may be a desire to switch to 9-bit communication mode from 10-bit communication mode, such as when the Node Rx 220 has been detected. As represented in state 410, therefore, the Node Tx 210 sends a predetermined number of "mute" commands to the Hub Rx 230. Nevertheless, as also shown in state 410, both the Ethernet-ready cable node 200 and Ethernet-ready cable hub 250 remain in the 10-bit compression mode until the appropriate number of mute commands have been sent and received. Thus, the predetermined number mute commands are transmitted and received while the Node Tx 210 is sending data using the 10-bit communication mode.

By way of explanation, the mode and/or mute commands described can be sent in a standard format that is independent of the instant communication mode. For example, even though the communication mode may specify that that RF data are in 9-bit or 10-bit communication mode, the mute and/or mode commands need not necessarily also be in 9-bit or 10-bit mode format. In particular, the relevant mute and/or mode command can be sent over a fiber link (e.g., path 260) with any RF and Ethernet data, albeit in a position in the data stream that is independent of the RF and Ethernet data.

Upon receiving at least one of a predetermined number of mute commands, the Ethernet-ready cable hub 250 starts to count the number of mute commands it receives. In particular, the predetermined number of mute commands can be more than one, such that the Ethernet-ready cable hub 250 and Ethernet-ready cable node 200 do not change state until the predetermined number of mute commands have been sent and received. Generally, this can help the overall system such that the system does not change relevant state until it should be changing its state. For example, after receiving a certain number of a single switch mode command, the Hub Rx 230 can be sure that the switch mode command is being intentionally sent by the Node Tx 210, such that a given switch mode command is not due to possible bit errors in the link. Assuming that this is the case for the description in FIG. 6, the Node Tx 210 and Hub Rx 230 remain in the 10-bit communication mode despite sending and receiving at least one mute command.

After the appropriate number of mute commands have been sent by the Node Tx 210, and have been received by the Hub Rx 230, the Hub Rx 230 transitions to the muted mode, as represented by state 420. Furthermore, the Node Tx 210 switches to the 9-bit communication mode, and starts sending 9-bit mode commands, as represented by state 430. This enables Ethernet traffic in the return direction (e.g., on return path 260). In at least one implementation, muted mode for the Hub Rx 230 also means that the Hub Rx 230 disables the RF outputs being routed through the D/A converters 235. Once the RF outputs are disabled, the Hub Rx 230 can "safely" convert to the next communication mode, in this case 9-bit communication mode. This is a "safe" transition since the boundary where the compression module in the signal logic 207B switches from 10-bit to 9-bit will not be sent to the RF outputs.

In any event, the Hub Rx 230 remains in 9-bit muted mode (states 420, 430) until also receiving a predetermined number of 9-bit switch mode commands. For example, the predetermined number of switch mode commands can also be one switch mode command, or multiple switch mode commands. Thus, after all of the predetermined number of 9-bit switch mode commands have been sent by the Node Tx 210, and have been received by the Hub Rx 230, the Hub Rx 230 transitions to the 9-bit mode state 440. At this state, the Hub Rx 230 can enable the RF outputs.

As illustrated in states 450-470, it may be desirable at some later point to switch from 9-bit communication mode back to 10-bit communication mode. For example, perhaps the Node Rx 220 is no longer functioning, or is not available, such that bi-directional Ethernet traffic is not possible. Alternatively, perhaps there is simply no Ethernet traffic communicating between the Ethernet-ready cable node 200 and Ethernet-ready cable hub 250. In these cases, 10-bit communication mode may be desired to preserve the processing resources associated with compression. Whatever the reason for returning to the 10-bit communication mode, states 450-470 show that the communication mode switching process is similar in the reverse direction.

To switch back to the first communication mode, the Node Tx 210 sends a predetermined number (one or more) of mute commands to the Hub Rx 230. In at least one implementation, an initial of the predetermined number mute commands causes the Hub Tx 230 to start counting the remaining of the predetermined number of incoming mute commands. Once all of the predetermined number of mute commands is received by the Hub Rx 230, the Hub Rx 230 can switch to muted mode, as represented by state 460. At this state, the Hub Rx 230 can again disable the RF outputs being routed through the D/A 235. Furthermore, the Hub Rx 230 can now safely convert to a different communication mode, in this case 10-bit communication mode. As before, this is a "safe" transition since the boundary where the compression module in the FPGA 207B switches from 9-bit to 10-bit mode will not be sent to the RF outputs.

As shown in state 470, after the Node Tx 210 sends all of the predetermined number of mute commands, the Node Tx 210 then starts sending 10-bit mode commands, which are counted by the Hub Rx 230. After the appropriate number of 10-bit mode commands have been sent by the Node Tx 210, and have been received by the Hub Rx 230, the Hub Rx 230 transitions to the 10-bit mode, and safely enables the RF outputs. This is illustrated as the system returns back to the default state 400.

Accordingly, the example implementations described herein allow corresponding CATV network components, such as an Ethernet-ready cable node 200 and the cable hub 250, to switch communication mode relatively simply, and flexibly. This allows Ethernet-ready components to be placed in a network that does not implement RF and Ethernet data communication mode, and to later switch the Ethernet-ready components to RF and Ethernet data communication mode. The principles and concepts of the present invention therefore provide for ease in configuring CATV components to support, or not support, Ethernet communications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a cable distribution network environment the method, a method comprising the following:
   an act of a cable node transmitting mode information to a cable hub over a subscriber to head end return path of a cable distribution network, the mode information at least inferring that the cable node will be transmitting Ethernet data to the cable hub;
   an act of the cable node compressing RF data using a compression algorithm to make bandwidth available for the Ethernet data; and
   after the act of the cable node transmitting mode information to the cable hub, an act of the cable node combining and transmitting Ethernet data and the compressed RF data to the cable hub.

2. The method as recited in claim 1, further comprising an act of the cable node transmitting one or more subsequent communications to the cable hub, such that the cable hub switches communication modes prior to the act of the cable node transmitting Ethernet data and the compressed RE data to the cable hub.

3. The method as recited in claim 1, wherein the mode information comprises a mute command, the mute command causing the cable hub to disable one or more outputs.

4. The method as recited in claim 3, wherein the mode information comprises a command that causes the cable hub to switch between an RF and Ethernet data communication mode and an RF data communication mode without Ethernet data while the one or more outputs are temporarily disabled by the mute command, wherein the one or more temporarily disabled outputs include outputs designated for the RF data.

5. The method as recited in claim 1, wherein the mode information comprises a command that causes the cable hub to switch from an RF data communication mode to an RF and Ethernet data communication mode.

6. The method as recited in claim 1, wherein the mode information comprises a command that causes the cable hub to switch from an RF and Ethernet data communication mode to an RF data communication mode.

7. In a cable distribution network environment the method, a method comprising the following:
  an act of a cable hub receiving mode information from a cable node over a subscriber to head end return path of a cable distribution network, the mode information at least inferring that the cable node will be transmitting Ethernet data to the cable hub;
  in response to receiving the mode information, an act of configuring the cable hub to receive communications that include both RF data and Ethernet data from the cable node;
  an act of receiving Ethernet data and compressed RF data from the cable node, wherein the RF data is compressed using the compression algorithm from the cable node; and
  an act of decompressing the RF data using the decompression version of the compression algorithm.

8. The method as recited in claim 7, farther comprising an act of the cable hub receiving one or more subsequent communications after the act of receiving mode information, such that the cable hub switches communication modes prior to receiving Ethernet data and compressed RF data from the cable node.

9. The method as recited in claim 7, wherein the mode information comprises a command that causes the cable hub to switch from an RF data communication mode to an RF and Ethernet data communication mode.

10. The method as recited in claim 7, wherein the mode information comprises a command that causes the cable hub to switch from an RF and Ethernet data communication mode to an RF data communication mode.

11. The method as recited in claim 7, wherein the mode information comprises a mute command, the method further comprising:
  in response to receiving the mute command, an act of disabling one or more outputs at the cable hub.

12. The method as recited in claim 11, wherein the mode information comprises a command that causes the cable hub to switch between an RF and Ethernet data communication mode and an RF data communication mode while the one or more outputs are temporarily disabled by the mute command, and resume communication with the cable node using the switched-to communication mode, wherein the temporarily disabled one or more outputs include outputs designated for the RF data.

13. The method as recited in claim 11, wherein the cable node further comprises a node transmission component and a node receiving component; and wherein the cable hub further comprises a hub receiving component and a hub transmission component.

14. The method as recited in claim 13, further comprising an act of the node receiving component identifying at least one of the presence of the hub receiving component and a data signal from the hub transmission component prior to the act of the cable hub receiving a mute command from the cable node.

15. In a cable distribution network environment that includes an Ethernet-ready cable node having a processing module with computer-executable instructions stored thereon that, when executed, cause the Ethernet-ready cable node to perform a method comprising the following:
  an act of transmitting mode information to a cable hub over a subscriber to head end optical return path, the mode information at least inferring that the Ethernet-ready cable node will be transmitting Ethernet data to the cable hub;
  an act of compressing RF data using the compression algorithm to make bandwidth available for the Ethernet data;
  after the act of transmitting mode information, an act of transmitting Ethernet data and the compressed RF data to the cable hub.

16. The cable node as recited in claim 15, wherein the processing module is a field programmable gate array.

17. In a cable distribution network environment that includes an Ethernet-ready cable hub having a processing module with computer-executable instructions stored thereon that, when executed, cause the Ethernet-ready cable hub to perform a method comprising the following:
  an act of a cable hub receiving mode information from the Ethernet-ready cable node over a subscriber to head end optical return path, the mode information at least inferring that the cable node will be transmitting Ethernet data to the cable hub;
  in response to receiving the mode information, an act of configuring the cable hub to receive communications that include both RF data and Ethernet data from the Ethernet-ready cable node;
  an act of receiving Ethernet data and compressed RF data from the Ethernet-ready cable node, wherein the RF data is compressed using the compression algorithm from the Ethernet-ready cable node; and
  an act of decompressing the RF data using the decompression version of the compression algorithm and transmitting the decompressed RF data to a cable modem termination system for demodulation.

18. The cable hub as recited in claim 17, wherein the processing module is a field programmable gate array.

19. The method as recited in claim 1, wherein the act of the cable node compressing RF data includes compressing 10-bit data frames to 9-bit data frames.

20. The method as recited in claim 1, wherein the mode information indicates one of a plurality of cable node modes and one of a plurality of cable hub modes, the plurality of cable hub modes being greater in quantity than the plurality of cable node modes.

* * * * *

UNITED STATES PATENT AND TRADEMARK OFFICE
CERTIFICATE OF CORRECTION

| | |
|---|---|
| PATENT NO. | : 7,519,078 B2 |
| APPLICATION NO. | : 10/845202 |
| DATED | : April 14, 2009 |
| INVENTOR(S) | : Oyadomari et al. |

It is certified that error appears in the above-identified patent and that said Letters Patent is hereby corrected as shown below:

Column 2
Line 33, change "usin" to --using--
Line 65, change "clock 152" to --clock 153A--

Column 3
Line 31, change "mechanism" to --mechanisms--
Line 32, change "seamlessly" to --seamless--

Column 5
Line 5, change "Node Tx 200" to --Node Tx 210--
Line 15, change "207D." to --207D--

Column 7
Line 31, change "comprise" to --comprises--
Line 43, remove [a]

Column 9
Line 54, change "advantage" to --advantages--

Column 10
Line 5, before "As" insert --.--
Line 54, remove the second instance of [that]

Column 12
Line 30, change "environment the method," to --environment, the method--
Line 31, remove [a method]
Line 48, change "RE" to --RF--

Signed and Sealed this
Twelfth Day of April, 2011

David J. Kappos
*Director of the United States Patent and Trademark Office*

CERTIFICATE OF CORRECTION (continued)

U.S. Pat. No. 7,519,078 B2

Column 13
Line 1, change "environment the method," to --environment, the method--
Line 2, remove [a method]
Line 18, change "farther" to --further--
Lines 46-47, change "cable node" to --method--